(12) United States Patent
Kim (10) Patent No.: US 10,646,316 B2
(45) Date of Patent: May 12, 2020

(54) APEX LOCATOR

(71) Applicant: GOODDOCTORS CO., LTD., Incheon (KR)

(72) Inventor: Young Woon Kim, Bucheon (KR)

(73) Assignee: GOODDOCTORS CO., LTD., Incheon (KR)

( * ) Notice: Subject to any disclaimer, the term of this patent is extended or adjusted under 35 U.S.C. 154(b) by 37 days.

(21) Appl. No.: 15/319,002

(22) PCT Filed: Oct. 17, 2016

(86) PCT No.: PCT/KR2016/011637
§ 371 (c)(1),
(2) Date: Dec. 15, 2016

(87) PCT Pub. No.: WO2017/086611
PCT Pub. Date: May 26, 2017

(65) Prior Publication Data
US 2018/0256302 A1 Sep. 13, 2018

(30) Foreign Application Priority Data
Nov. 18, 2015 (KR) .................. 10-2015-0162010

(51) Int. Cl.
*A61C 19/04* (2006.01)

(52) U.S. Cl.
CPC .......... *A61C 19/041* (2013.01); *A61C 19/042* (2013.01)

(58) Field of Classification Search
CPC .................... A61C 19/041; A61C 19/042
See application file for complete search history.

(56) References Cited

U.S. PATENT DOCUMENTS

| 6,036,490 A | 3/2000 | Johnsen et al. | |
|---|---|---|---|
| 2008/0156836 A1* | 7/2008 | Wadsworth | A45C 11/00 224/269 |
| 2008/0187880 A1* | 8/2008 | Becker | A61C 19/041 433/25 |
| 2009/0148810 A1 | 6/2009 | Maxwell et al. | |
| 2010/0063377 A1* | 3/2010 | Becker | A61C 19/041 600/407 |
| 2015/0086937 A1* | 3/2015 | Katsuda | A61C 1/186 433/27 |

(Continued)

FOREIGN PATENT DOCUMENTS

| JP | 2002-011025 | 1/2002 |
| JP | 2008-068015 | 3/2008 |
| JP | 2009-527341 | 7/2009 |

*Primary Examiner* — Yogesh P Patel
(74) *Attorney, Agent, or Firm* — Lex IP Meister, PLLC (57) ABSTRACT

The present invention provides a root canal length measuring device including: a measuring module configured to include a file hook electrically connected to an endodontic file, and a lip hook to be connected to a lip or a gum; a control module configured to measure the value of impedance which varies as the file moves from the surface of a tooth toward the apex of the root of the tooth, and provide an image signal or a sound signal representing information on the position of the apex of the root and information on the length of the apex of the root; and a communication module configured to receive the image signal or the sound signal from the control module, and wirelessly transmit the received signal to a smart device in real time.

10 Claims, 13 Drawing Sheets

(56) References Cited

U.S. PATENT DOCUMENTS

2015/0238292 A1* 8/2015 Boe .................... A61C 13/0025
                                                      433/171
2017/0042649 A1* 2/2017 Otsuka ................. A61C 19/042

* cited by examiner

APEX LOCATOR

TECHNICAL FIELD

The present invention relates to a root canal length measuring device, and more particularly, to a root canal length measuring device which transmits a root canal length measuring process to a smart device such as a smart phone or a tablet PC by near field communication such that the process is visually displayed on the outside so as to be recognizable, and has a small size so as to be easily mounted.

BACKGROUND ART

Inside a tooth, there is tissue called dental pulp, and this dental pulp is composed of nerves, blood vessels, and so on, and supplies nourishment, water, and the like to the tooth, and performs a sensory function. An inflammation of the dental pulp caused by an infection resulting from dental caries and so on is called pulpitis, and causes an inflammation of periapical bone tissue of the root portion of the tooth.

In this case, root canal treatment (endodontic treatment) may be performed. The root canal treatment is a procedure of completely removing the infected dental pulp tissue with a special tool, and disinfecting the root canal, thereby making the root canal germ-free, and filling the space previously occupied by the dental pulp with a biocompatible material.

In order to treat the root canal, a step of measuring the length of the root canal should be performed in advance.

Root canal length measuring devices which are usable to measure the length of the root canal are devices using electrical resistances of human body to detect that the devices reach periapical tissue, and have been created on the basis of a principle in which if a lip and periapical periodontal ligament of a person are connected by a conducting wire, and a cutting tool such as a file or a reamer is inserted into a root canal while a current having predetermined intensity is applied, when the cutting tool reaches the apex of a root of a tooth, resistance becomes a certain value.

Most root canal length measuring devices using the above-described method to measure the lengths of root canals are provided in a terminal form, and are placed on tables of unit chairs or separate tables installed in dental offices, and then are used to measure the lengths of root canals.

For this reason, as treatments progress, lead wires connected to probes increase inconvenience, and when users (dentists) provide treatments, they should check small-sized display units (LCDs) of those root canal length measuring devices while observing affected parts of patients, and thus feel inconvenience.

DISCLOSURE OF INVENTION

Technical Problem

Therefore, an object of the present invention is to provide a root canal length measuring device capable of overcoming the above-described problems of the related art.

Another object of the present invention is to provide a root canal length measuring device which is visually recognizable and can be more easily mounted.

A further object of the present invention is to provide a root canal length measuring device which can perform wireless communication with a smart device such that root canal length measurement results can be displayed on the screen of the smart device, and can be manufactured in a small size, and is simple to use.

Technical Solution

According to an embodiment of the present invention for achieving some of the above-described technical objects, a root canal length measuring device includes: a measuring module configured to include a file hook which is electrically connected to an endodontic file for removing dental pulps from root canals and enlarging root canals, a lip hook which is connected to a lip or a gum serving as a ground, and a cable and a connector to which the file hook and the lip hook are connected; a control module configured to measure the value of impedance which varies as the file moves from the surface of a tooth toward the apex of the root of the tooth, and provide an image signal or a sound signal representing information on the position of the apex of the root of the tooth and information on the length of the apex of the root of the tooth; and a near field communication module configured to receive the image signal or the sound signal representing the information on the position of the apex of the root of the tooth and the information on the length of the apex of the root of the tooth calculated by the control module, from the control module, and wirelessly transmit the received signal to a smart device in real time.

The smart device may be any one of a smart phone, a tablet PC, and a laptop.

The near field communication module may be any one module selected from Bluetooth modules for Bluetooth communication, Zigbee communication modules, and WiFi communication modules.

The root canal length measuring device may include a mounting unit capable of being mounted on a portion of a dental ruler to be worn on a finger of a user like a ring in order to measure the length of the endodontic file.

The portion of the dental ruler may have a straight hole, and the mounting unit may be configured such that one end portion is hinged on a case of the root canal length measuring device and the other end portion has a straight protrusion to be inserted into the straight hole, and include an elastic member for returning the other end portion to its original state by an elastic force if the other end portion is moved apart from the case.

The root canal length measuring device may have at least one joint groove formed in a side surface of a case so as to be capable of being mounted on a portion of a dental ruler to be worn on a finger of a user like a ring in order to measure the length of the endodontic file, and one side surface of the dental ruler may have at least one joint protrusion to be inserted into the at least one joint groove.

The root canal length measuring device and a dental ruler to be worn on a finger of a user in order to measure the length of the endodontic file may have a ball joint combination structure, and the dental ruler may have a ball, and a case of the root canal length measuring device may have a casing for receiving the ball.

The root canal length measuring device and a dental ruler to be worn on a finger of a user like a ring in order to measure the length of the endodontic file may have a joint structure using permanent magnets, and a portion of the dental ruler may have at least one first permanent magnet, and one side of the rear surface of a case of the root canal length measuring device may have at least one second permanent magnet to be joined with the first permanent magnet.

The root canal length measuring device may be mounted on a dental ruler to be worn on a finger of a user like a ring in order to measure the length of the endodontic file, and a portion of the dental ruler may has a shape hole having a predetermined shape.

The rear surface of a case of the root canal length measuring device may have a shaft protruding by a predetermined length, and a shape plate formed at the end portion of the shaft such that it becomes the same shape as that of the shape hole if rotating 180 degrees. In this case, after the shape plate is inserted into the shape hole, if the root canal length measuring device is rotated 180 degrees, the dental ruler and the root canal length measuring device are joined.

The root canal length measuring device may be joined with a dental ruler to be worn on a finger of a user like a ring in order to measure the length of the endodontic file, in a sliding manner, and a portion of the dental ruler may have a sliding rail groove having a predetermined length, and the rear surface of a case of the root canal length measuring device may have a sliding rail protrusion having a predetermined length. In this case, the rail protrusion is inserted into the rail groove in a sliding manner, whereby the root canal length measuring device is joined with the dental ruler.

The root canal length measuring device can be mounted on a dental ruler to be worn on a finger of a user like a ring in order to measure the length of the endodontic file, and the dental ruler may have a mounting cover for locking the rear surface of a case of the root canal length measuring device, and the edge portion of the mounting cover may have a hook for improving joint strength in a case where the root canal length measuring device is inserted.

Advantageous Effects

According to the present invention, the root canal length measuring device has advantages in which it can perform wireless communication with a smart phone such that root canal length measurement results can be displayed on the screen of the smart device, and can be manufactured in a small size, and is simple to use. Also, the root canal length measuring device can be mounted on various devices such as a dental ruler in order to use the root canal length measuring device.

BEST MODE FOR CARRYING OUT THE INVENTION

Hereinafter, preferred embodiments of the present invention will be described in detail with reference to the accompanying drawings, only for the purpose of providing a thorough understanding of the present invention to those skilled in the art to which the present invention pertains.

Figure 1:
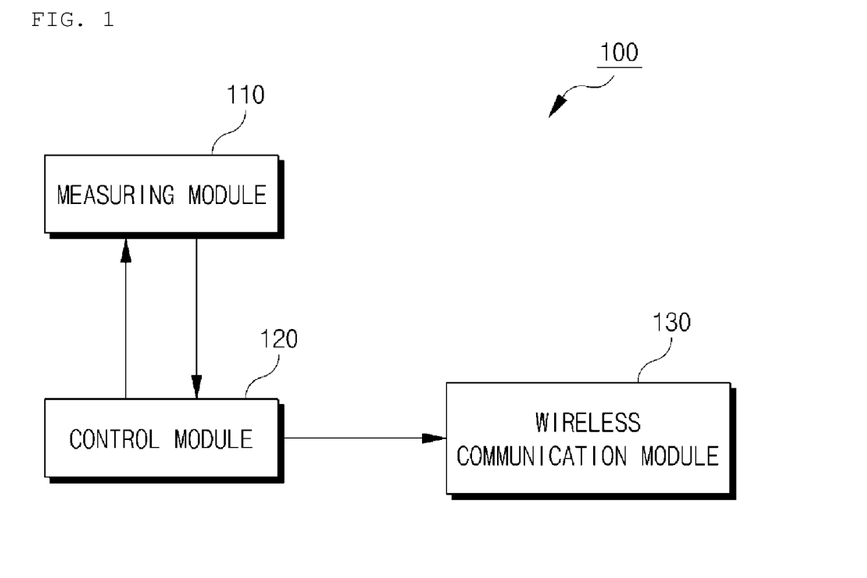
FIG. 1 is a block diagram illustrating the internal configuration of a root canal length measuring device according to a first embodiment of the present invention.
Figure 2:
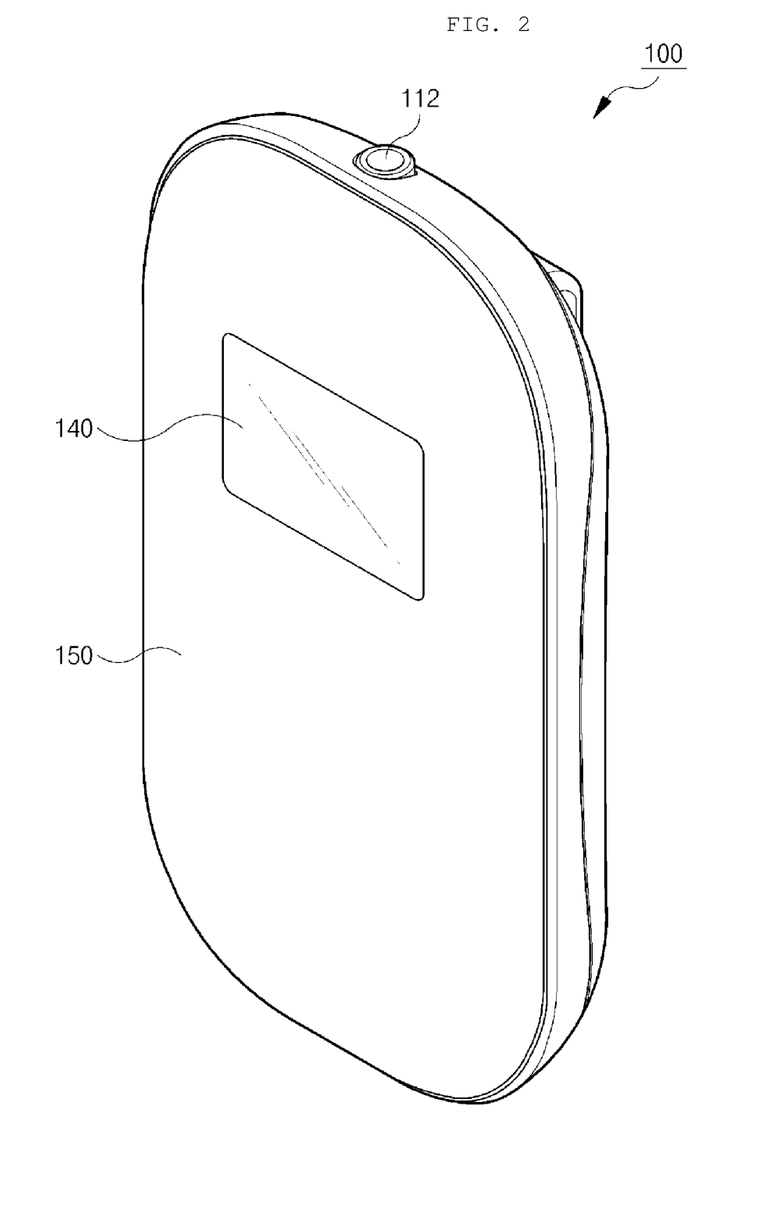
FIG. 2 is a perspective view illustrating the external appearance of the root canal length measuring device of FIG. 1.
Figure 3:
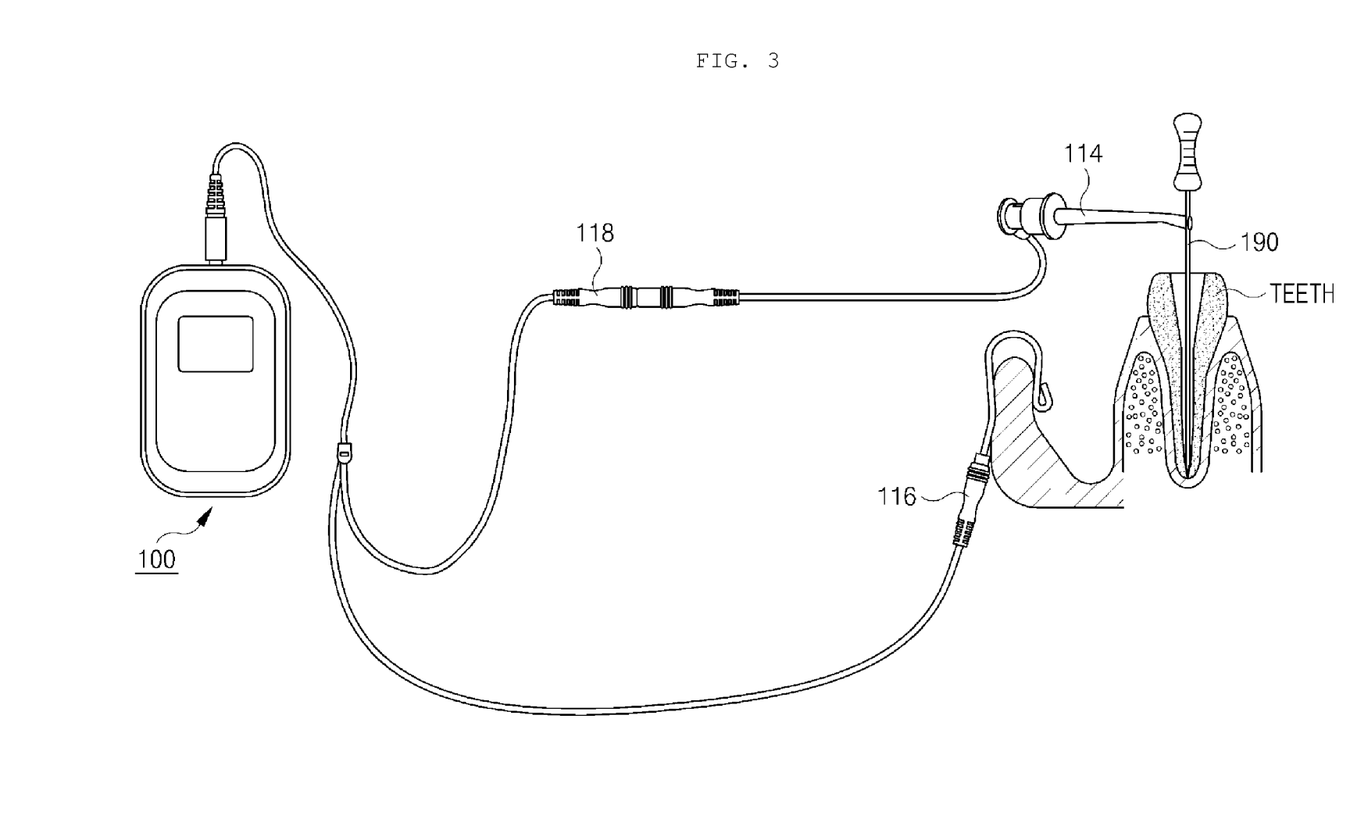
FIG. 3 is a view illustrating an example of use of the root canal length measuring device.

FIG. 1 is a block diagram illustrating the internal configuration of a root canal length measuring device 100 according to a first embodiment of the present invention, and FIG. 2 is a perspective view illustrating the external appearance of the root canal length measuring device 100 of FIG. 1, and FIG. 3 is a view illustrating an example of use of the root canal length measuring device 100. Also, FIG. is a view illustrating communication between the root canal length measuring device 100 and a smart device 180.

As shown in FIGS. 1 to 4, the root canal length measuring device 100 according to the first embodiment of the present invention includes a measuring module 110, a control module 120, and a wireless communication module 130 inside and outside an external case 150. The external case 150 has a connector 112 for establishing a connection with the measuring module 110, and has a small-sized display screen 140.

The measuring module 110 has a file hook 114 which is electrically connected to an endodontic file 190 for removing dental pulps from root canals and enlarging root canals, a lip hook 116 which is connected to a lip or a gum serving a ground, and a cable (including a connector) 118 to which the file hook 114 and the lip hook 116 are connected.

The control module 120 calculates the value of impedance which varies as the file 190 moves from the surface of a tooth toward the apex of the root of the tooth, thereby calculating information on the position of the apex of the root of the tooth and information on the length of the apex of the root of the tooth, and provides an image signal or a sound signal representing the calculated information. In other words, the calculated information is provided to the outside through a built-in display unit or a built-in speaker. The configuration of the control module 120 and the measuring module 110 is similar or identical to the configuration of a root canal length measuring device generally well-known to those skilled in the art to which the present invention pertains.

If the near field communication module 130 receives the image signal or the sound signal representing the information on the position of the apex of the root of the tooth and the information on the length of the apex of the root of the tooth calculated by the control module 120, from the control module, it wirelessly transmits the received signal to a smart device in real time.

The smart device may be any one of a smart phone, a tablet PC, and a laptop, and may include every other smart device capable of near field communication.

The near field communication module 130 may be any one module selected from Bluetooth modules for Bluetooth communication, Zigbee communication modules, and WiFi communication modules.

As the size of the root canal length measuring device 100 decreases, since the size of the display screen 140 on the outside of the root canal length measuring device 100 also decreases, recognizability of the information on the position of the apex of the root of the tooth and the information on the length of the apex of the root of the tooth displayed on the display screen 140 decreases.

Figure 4:
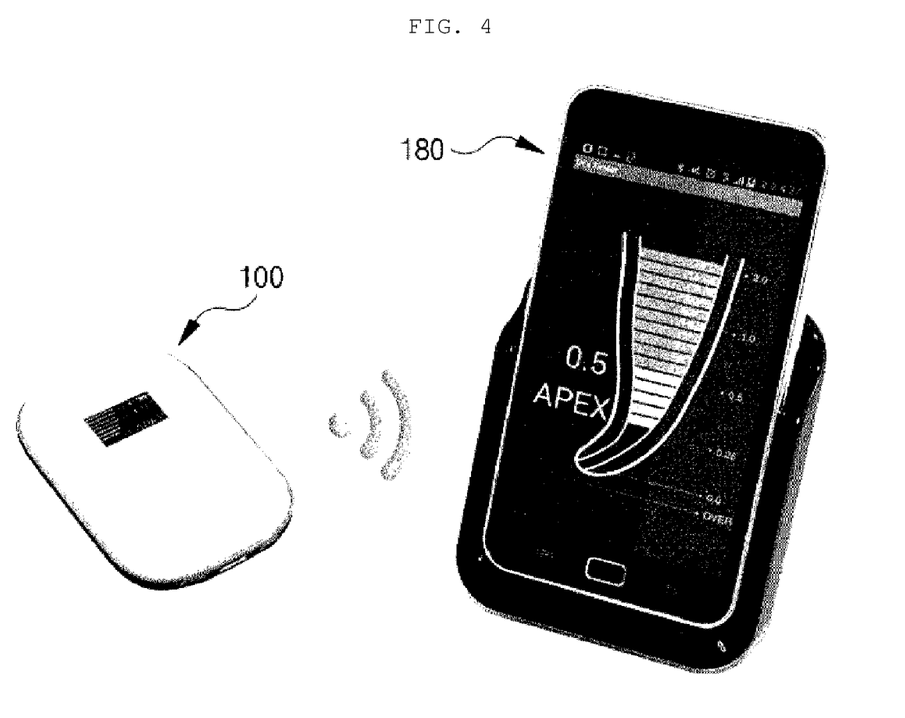
FIG. 4 is a view illustrating communication between the root canal length measuring device and a smart device.

For this reason, in order to overcome the limitations of the small-sized display screen which is a restriction factor of the root canal length measuring device 100 and make it possible for a user (a dentist) to visually and easily recognize information, the root canal length measuring device 100 is configured to include the near field communication module 130 such that near field communication with smart devices such as smart phones and tablet PCs is possible. Therefore, as shown in FIG. 4, it is possible to display information on the position of the apex of the root of a tooth and information on the length of the apex of the root of the tooth on the display screen of the smart device 180 such as a smart phone or a tablet PC. In this case, information on sound can also be transmitted, whereby it is possible to reproduce the sound by the smart device.

In short, the root canal length measuring device 100 can wirelessly transmit image information and sound information which should be provided to the outside, to the smart device, through the near field communication module 130, such that the image information and the sound information can be reproduced in the smart device, and thus does not need to include a large-sized display screen and a sound reproducer such as a speaker. Therefore, the root canal length measuring device 100 can be downsized and it is possible to decrease the number of internal components, whereby the root canal length measuring device can be lightened. Therefore, it is possible to place the root canal length measuring device on various places and then use it.

During a measuring operation, the root canal length measuring device 100 having the above-described configuration can calculate the value of impedance which varies according to the movement distance of the tip of the file 190 toward the apex of the root of a tooth, and transmits information on the position of the apex of the root of the tooth and information on the length of the apex of the root of the tooth to the smart device 180 through the wireless communication module 130 such that the smart device can reproduce the corresponding information on the display screen of such that visibility is satisfied, and has an advantage of being simple and being capable of improving portability.

Figure 5:
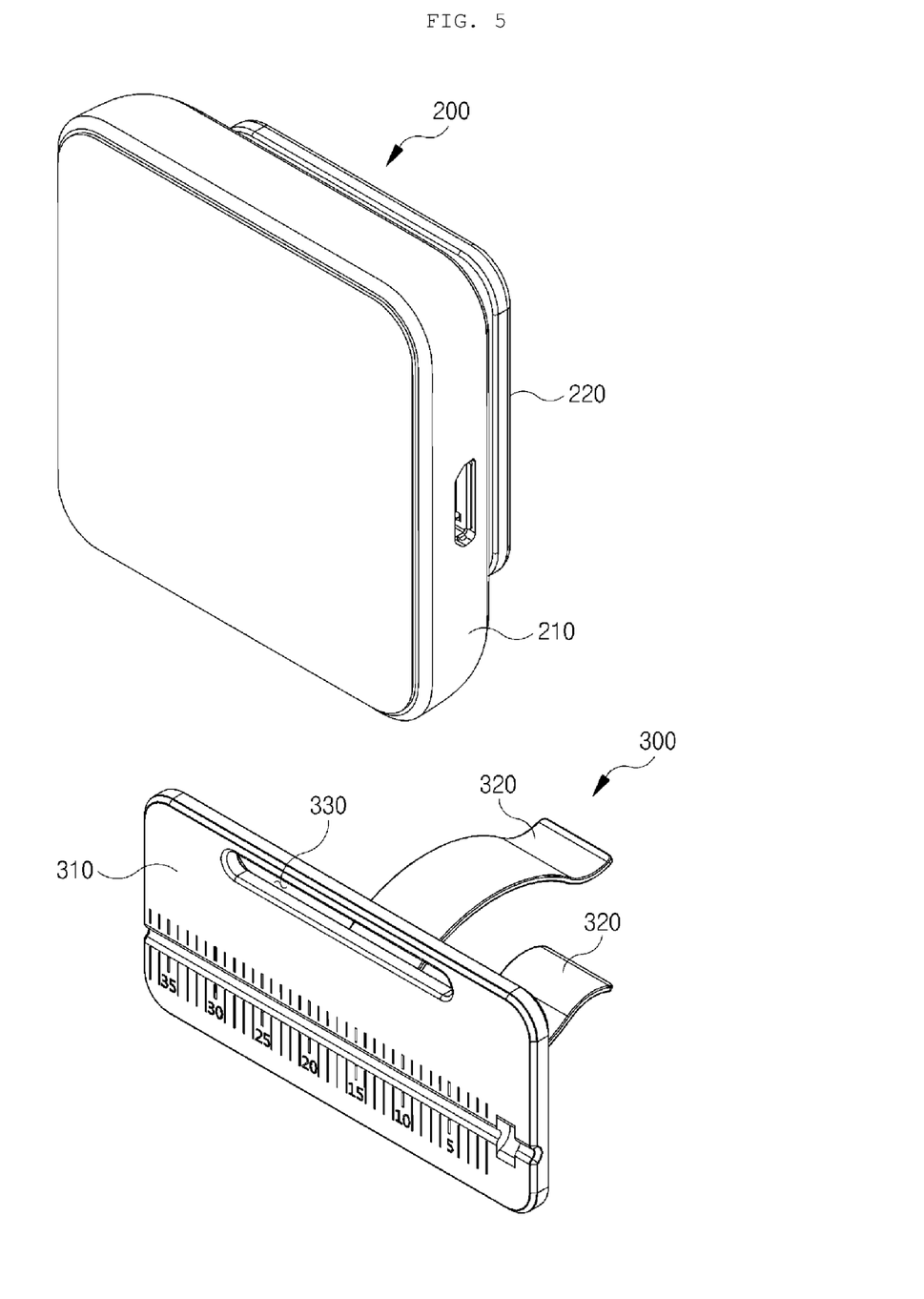
FIG. 5 is a perspective view illustrating the root canal length measuring device and a dental ruler before the root canal length measuring device is mounted on the dental ruler.
Figure 6:
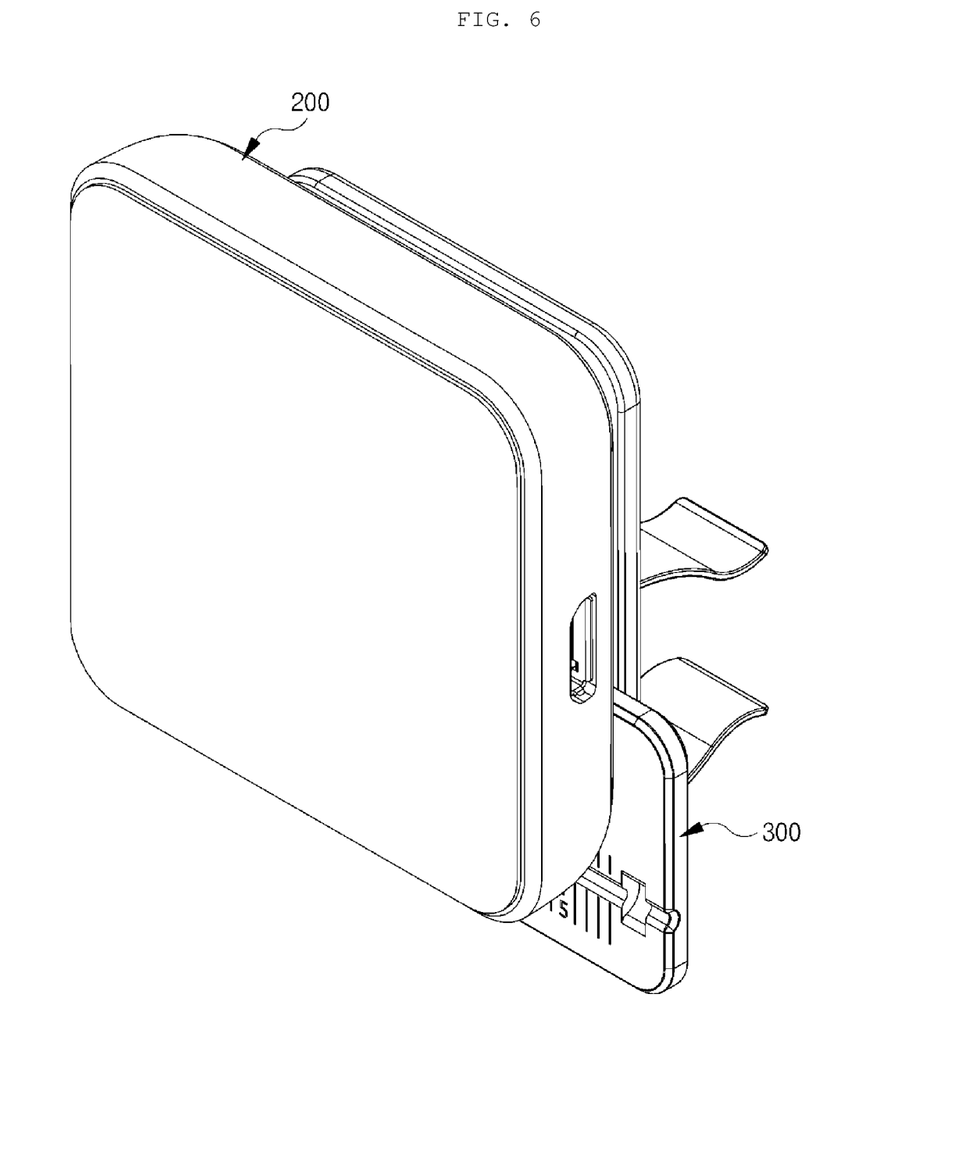
FIG. 6 is a perspective view illustrating the root canal length measuring device mounted on the dental ruler.
Figure 7:
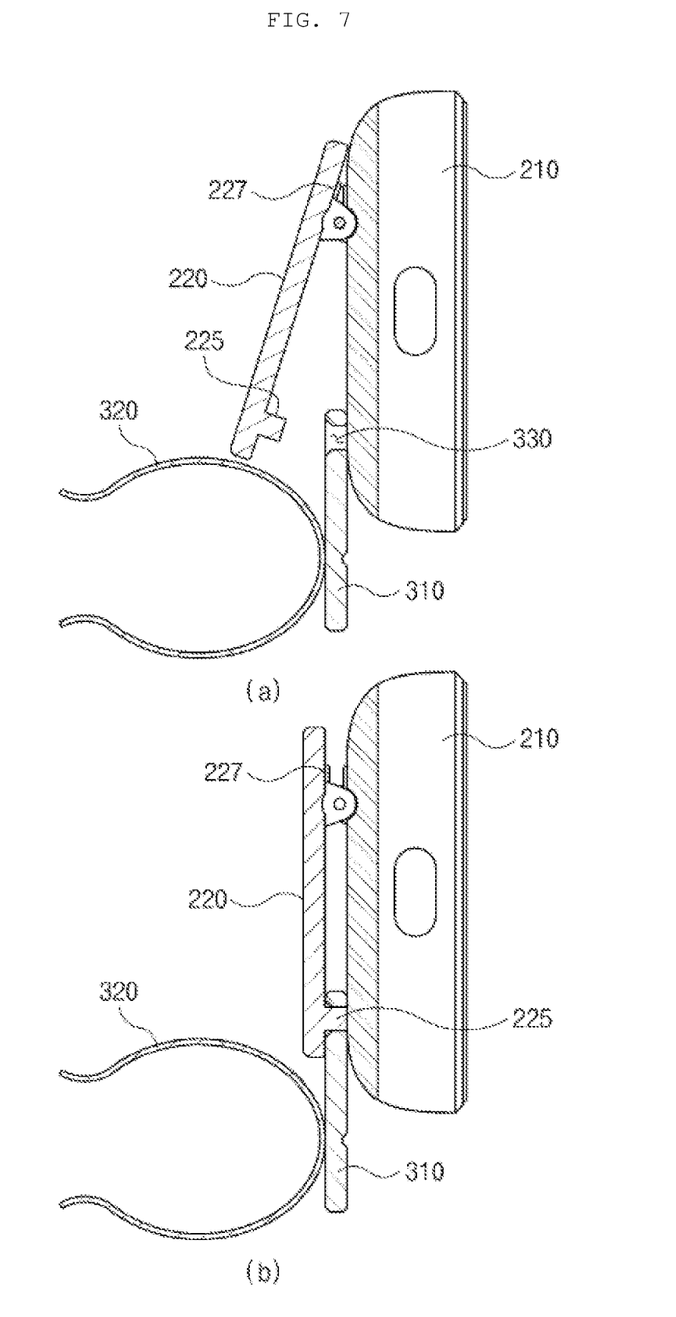
FIG. 7 is a cross-sectional view illustrating a process of mounting the root canal length measuring device on the dental ruler.

FIGS. 5 to 7 are views illustrating a root canal length measuring device 200 according to a second embodiment of the present invention, and a structure in which the root canal length measuring device is mounted on a dental ruler 300. FIG. 5 is a perspective view illustrating the root canal length measuring device 200 and the dental ruler 300 before the root canal length measuring device is mounted on the dental ruler, and FIG. 6 is a perspective view illustrating the root canal length measuring device 200 mounted on the dental ruler 300, and FIG. 7 is a cross-sectional view illustrating a process of mounting the root canal length measuring device 200 on the dental ruler 300.

As shown in FIGS. 5 to 7, the root canal length measuring device 200 according to the second embodiment of the present invention has the same configuration as that of the root canal length measuring device 100 according to the first embodiment of the present invention, and thus the internal configuration thereof will not be described.

The root canal length measuring device 200 can be manufactured in a small size as described with reference to FIGS. 1 to 4, and thus can be placed or mounted on various places, objects, user's clothes, and other instruments and be used.

Meanwhile, in dental clinics, during endodontic treatment, dentists wear dental rulers on their fingers, like rings. Since the dental ruler 300 is required to be used to measure the lengths of the endodontic file and files for other treatments, during endodontic treatment, a dentist always wears the dental ruler like a ring, and holds it.

As shown in FIG. 5, the dental ruler 300 has a structure including a rectangular plate 310 having a front surface graduated and a rear surface having a wearable unit 320 having a circular arc shape or a semicircle shape such that it is possible to wear the dental ruler on a finger.

During endodontic treatment, the dentist is required to wear the dental ruler 300 on a finger. Because of this point, if it is possible to mount the root canal length measuring device 200 on the dental ruler 300, it is easy to use the root canal length measuring device, and it is possible to prevent the root canal length measuring device from causing inconvenience of patients.

To this end, the root canal length measuring device 200 may have a mounting unit 220 configured such that it is possible to mount the root canal length measuring device on a portion of the dental ruler 300, and the portion of the dental ruler 300 may have a straight hole 330. The straight hole 330 is generally formed on the upper side of the dental ruler 300; however, it may be formed at various positions.

The mounting unit 220 is configured such that one end portion is hinged on a case 210 of the root canal length measuring device 200 and the other end portion has a straight protrusion 225 to be inserted into the straight hole 330.

Further, the hinged portion of the mounting unit 220 may have an elastic member 227 for returning the other end portion of the mounting unit 220 to its original state by an elastic force if the other end portion is moved apart from the case 210.

In a case of mounting the root canal length measuring device 200 on the dental ruler 300, the mounting unit 220 of the root canal length measuring device 200 is rotated such that the other end portion of the mounting unit 220 is opened as shown in (a) of FIG. 7, and then the straight protrusion 225 is inserted into the straight hole 330 of the dental ruler 300 such that the straight protrusion 225 comes into contact with the rear surface of the case 210 as shown in (b) of FIG. 7.

In this state, the dental ruler 300 is worn on a finger of the dentist. Therefore, it is unnecessary to prepare a separate place for putting the root canal length measuring device 200, and it is unnecessary to fear that inconvenience of patients may be caused.

Besides, the root canal length measuring device 200 can be joined with the dental ruler 300 in various joint manners.

FIGS. 8 to 13 are views illustrating various examples in which the root canal length measuring device is mounted on the dental ruler. Hereinafter, the individual examples will be described.

Figure 8:
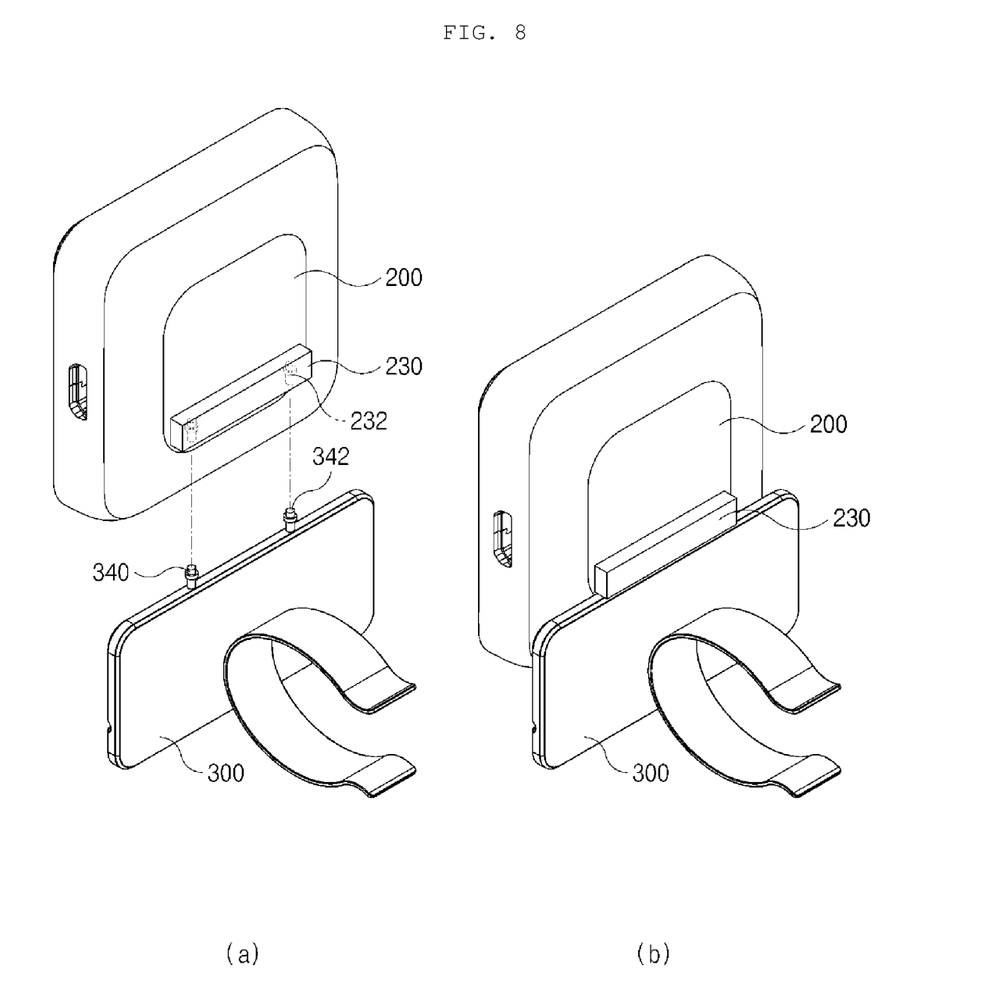
FIGS. 8 to 13 are views illustrating various examples in which a root canal length measuring device is mounted on a dental ruler.

In FIG. 8, (a) shows a state before the root canal length measuring device is mounted on the dental ruler, and in FIG. 8, (b) shows a state in which the root canal length measuring device is mounted on the dental ruler.

As shown in (a) and (b) of FIG. 8, the root canal length measuring device 200 has a mounting unit 230 for mounting the root canal length measuring device on a portion of the dental ruler 300.

The mounting unit 230 may be a rod-shaped member having a rectangular cross section, and having a predetermined length, and having joint grooves 232 formed on one side, and be attached to the rear surface of the root canal length measuring device 200. Alternatively, the mounting unit may be attached to a side surface of the root canal length measuring device 200.

The mounting unit 230 has at least one joint groove 232 formed in one surface. The joint groove 232 may be configured to have a circular cross section and have a locking groove radially formed in the inner circumferential surface of the joint groove 232 along the circumferential direction such that a locking protrusion 342 (to be described below) can be inserted therein.

The at least one joint groove 232 may be directly formed in a side surface of the case of the root canal length measuring device 200, not in the separate mounting unit 230.

The dental ruler 300 has at least one joint protrusion 340 formed as a counterpart to at least one joint groove on one side surface such that it can be inserted into the joint groove 232. The joint protrusion 340 may be configured to have a circular cross section, and may further have the locking protrusion 342 formed on the outer circumferential surface of the joint protrusion 340 along the circumferential direction so as to radially protrude.

Figure 9:
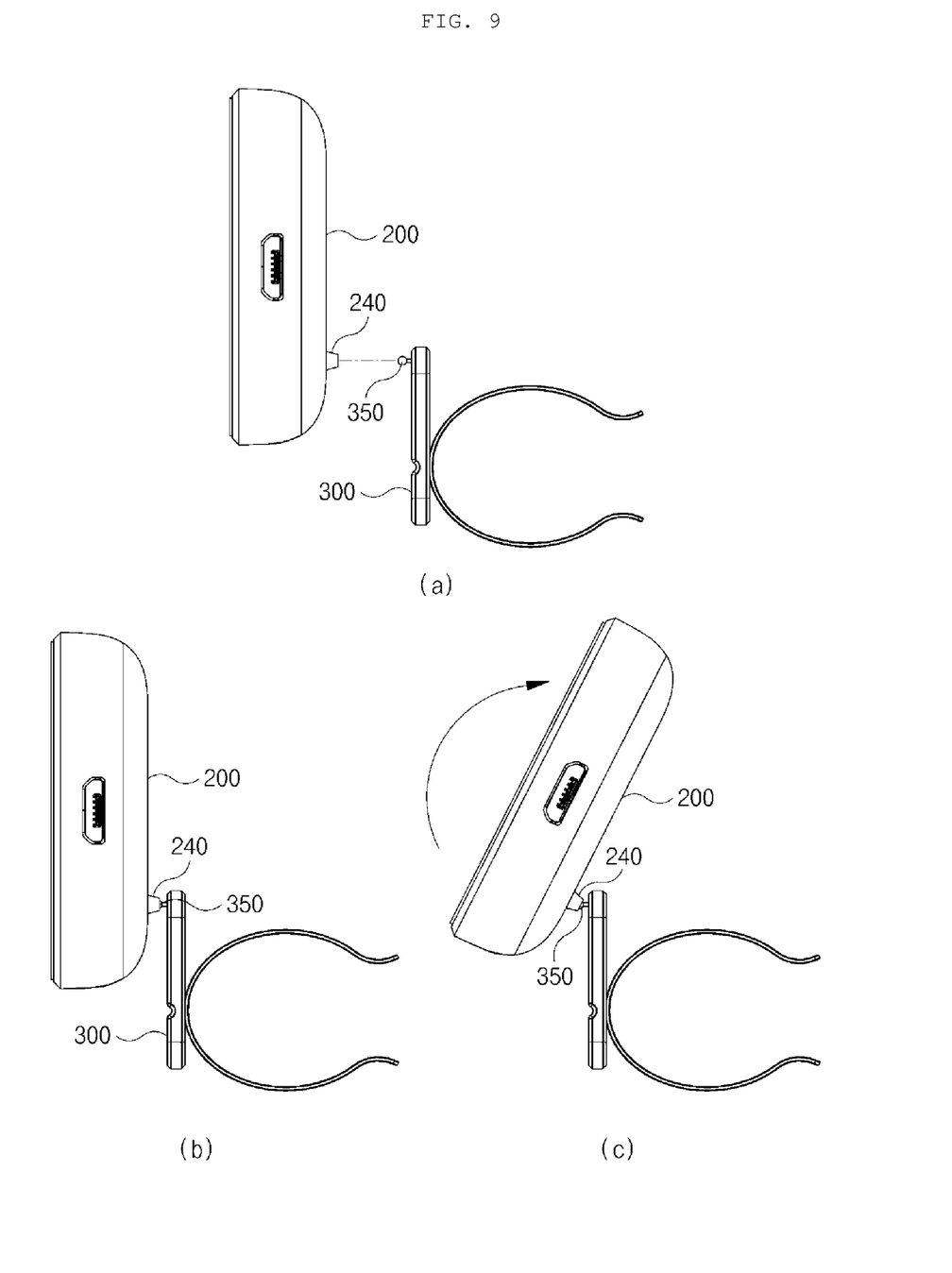

In FIG. 9, (a) shows a state before the root canal length measuring device is mounted on the dental ruler, and in FIG. 9, (b) and (c) show states in which the root canal length measuring device is mounted on the dental ruler.

As shown in (a), (b), and (c) of FIG. 9, the dental ruler 300 and the root canal length measuring device 200 may have a ball joint combination structure.

An upper portion of the dental ruler 300 has a ball 350 for a ball joint combination, and a portion of the case of the root canal length measuring device 200 (for example, a lower portion of the rear surface) has a casing 240 for receiving the ball 350, thereby forming a ball joint combination.

If the dental ruler 300 and the root canal length measuring device 200 have the ball joint combination structure, as shown in (c) of FIG. 9, the ball can freely rotate in the casing, and thus there is an advantage in which it is possible to freely rotate the root canal length measuring device 200.

Figure 10:
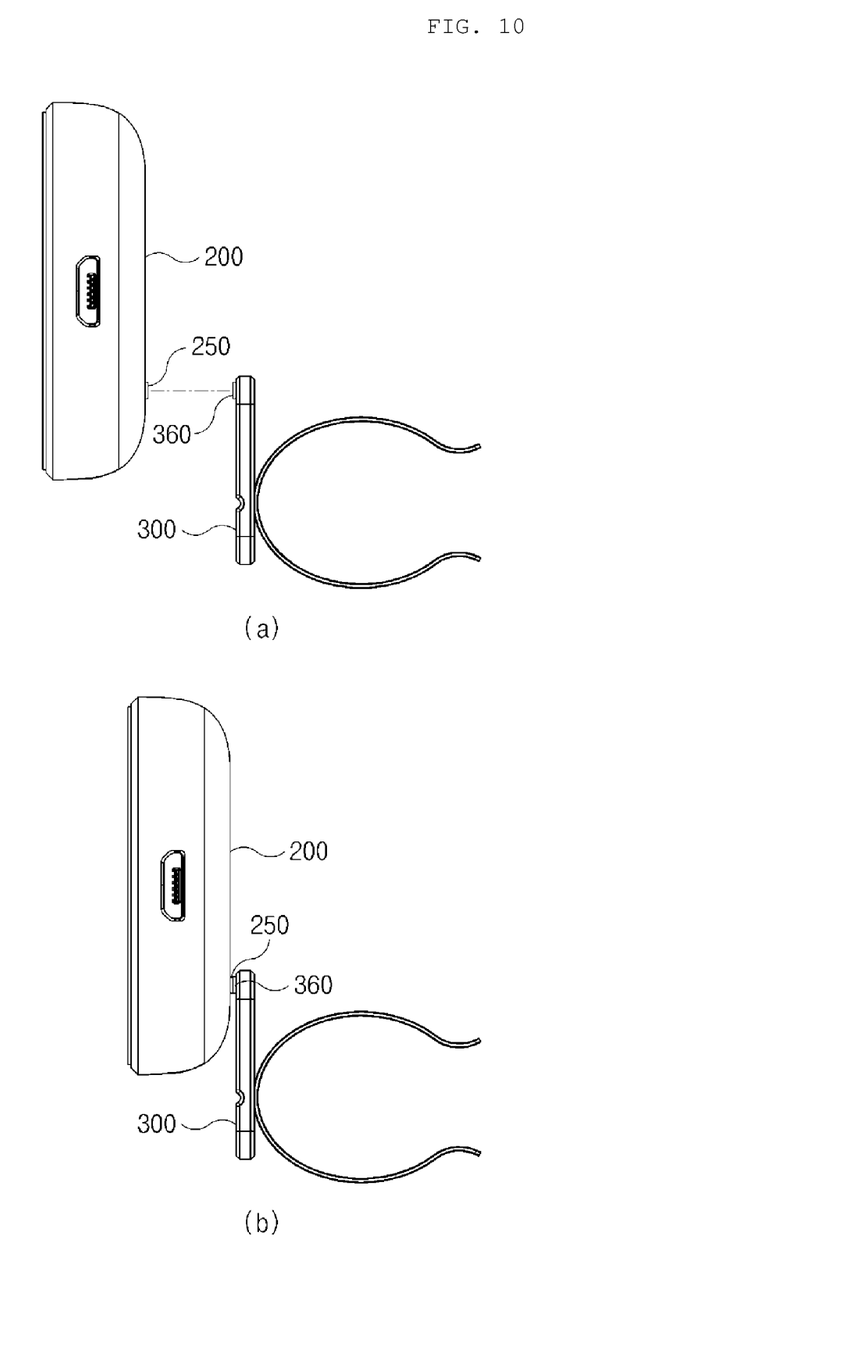

In FIG. 10, (a) shows a state before the root canal length measuring device is mounted on the dental ruler, and in FIG. 10, (b) shows a state in which the root canal length measuring device is mounted on the dental ruler.

As shown in (a) and (b) of FIG. 10, the dental ruler 300 and the root canal length measuring device 200 may have a joint structure using permanent magnets.

To this end, a portion of the dental ruler 300 (for example, an upper portion of the front surface) may have at least one first permanent magnet 360, and one side of the rear surface of the case of the root canal length measuring device 200 may have at least one second permanent magnet 250 to be joined with the first permanent magnet 360. In the case of using the permanent magnets, there is an advantage in which mounting and separating are easy.

Figure 11:
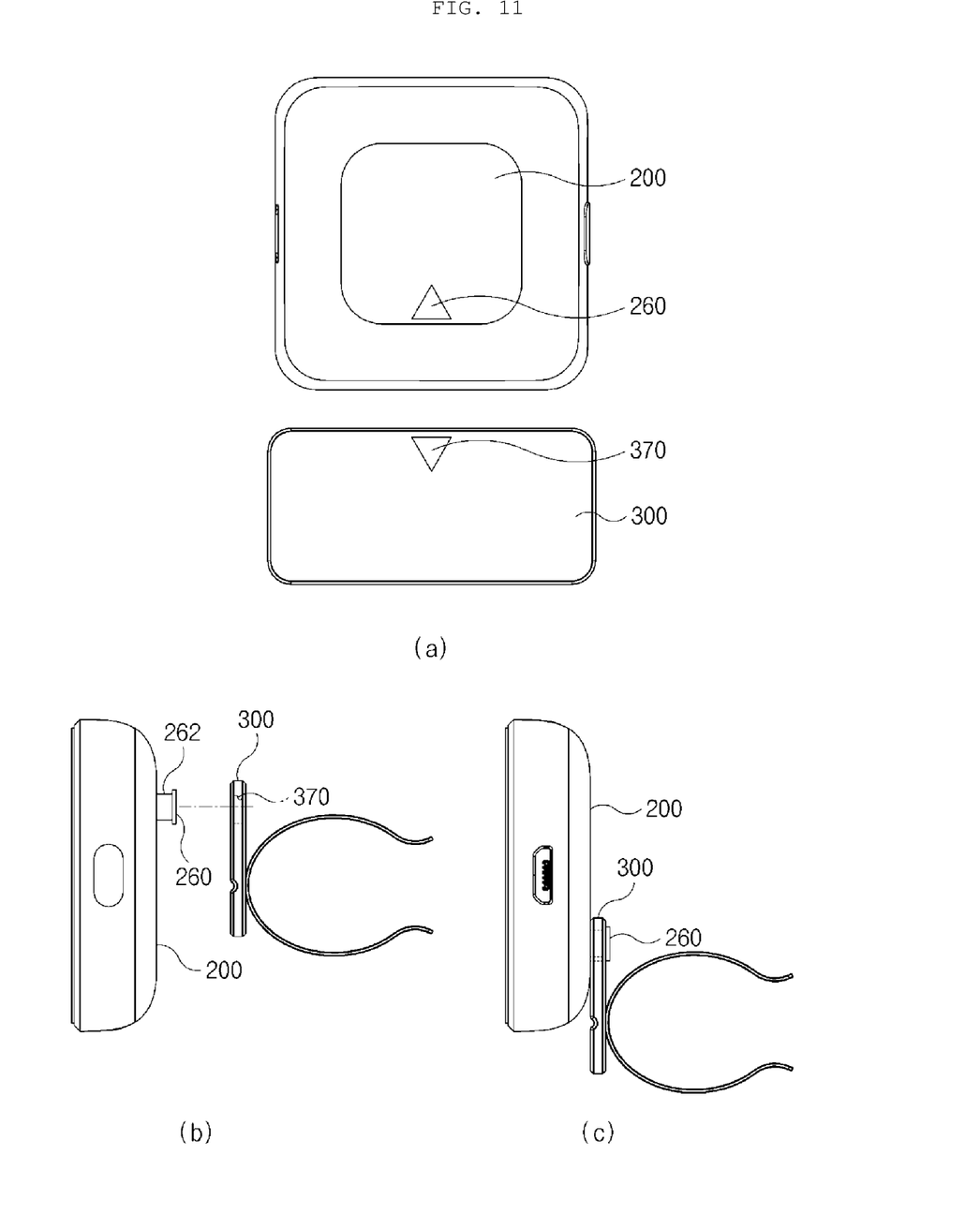

In FIG. 11, (a) and (b) are a front view and a side view illustrating a state before the root canal length measuring device is mounted on the dental ruler, and in FIG. 11, (c) shows a state in which the root canal length measuring device is mounted on the dental ruler.

As shown in (a), (b), and (c) of FIG. 11, the dental ruler 300 and the root canal length measuring device 200 may have a joint structure using a shape plate 260 and a shape hole 370 having predetermined shapes.

To this end, in an upper portion of the dental ruler 200, the shape hole 370 having the predetermined shape (for example, an inverted triangle shape) is formed. Further, the rear surface of the case of the root canal length measuring device 200 has a shaft 262 protruding by the predetermined length, and the shape plate 260 formed at an end portion of the shaft 262 such that it becomes the same shape as that of the shape hole 370 if rotating 180 degrees.

The shape plate 260 has a triangular shape as a basic shape, and becomes an inverted triangle shape identical to the shape hole 370 if rotating 180 degrees, such that it can be inserted into the shape hole 370. After the shape plate is inserted, if the root canal length measuring device 200 is rotated 180 degrees such that the shape plate 260 becomes the inverted shape of the shape of the shape hole 370, the joint state is maintained. Thereafter, during separation, the root canal length measuring device 200 is rotated 180 degrees, thereby capable of being separated.

In order to surely maintain the joint state, the shaft 262 may be configured to be elastic. In this case, the shape plate 260 and the shape hole 370 may be implemented in various polygonal shapes other than the above-described triangular shape.

Figure 12:
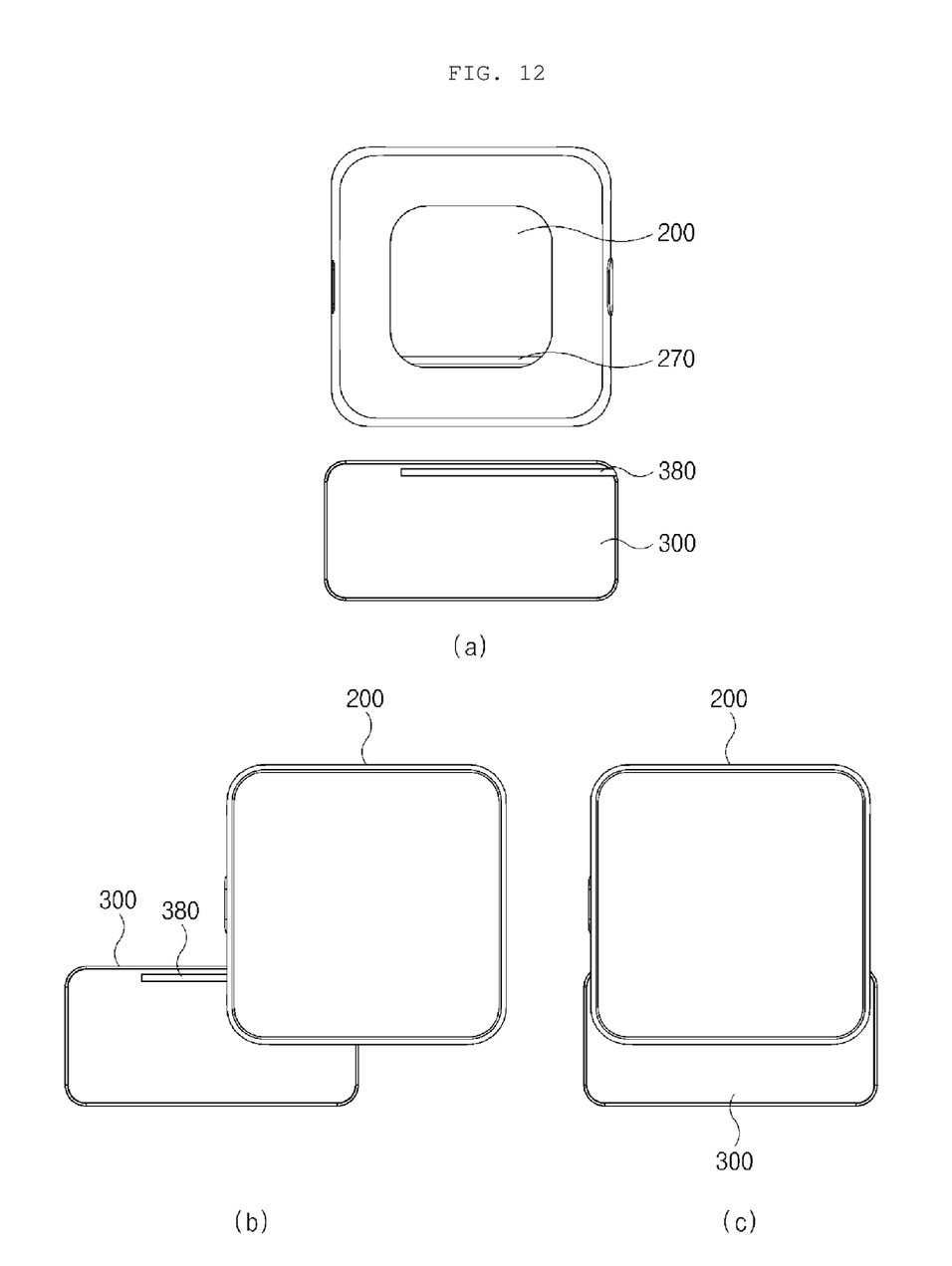

In FIG. 12, (a) shows a state before the root canal length measuring device is mounted on the dental ruler, and in FIG. 12, (b) and (c) show a process of mounting the root canal length measuring device on the dental ruler.

As shown in (a), (b), and (c) of FIG. 12, the dental ruler 300 and the root canal length measuring device 200 may have structures capable of being joined in a sliding manner.

To this end, a portion of the dental ruler 300 (for example, an upper portion) may have a sliding rail groove 380 having a predetermined length, and the rear surface of the case of the root canal length measuring device 200 may have a sliding rail protrusion 270 having a predetermined length.

In this case, the rail protrusion 270 can be inserted into the rail groove 380 in the sliding manner, whereby the root canal length measuring device and the dental ruler can be joined.

Figure 13:
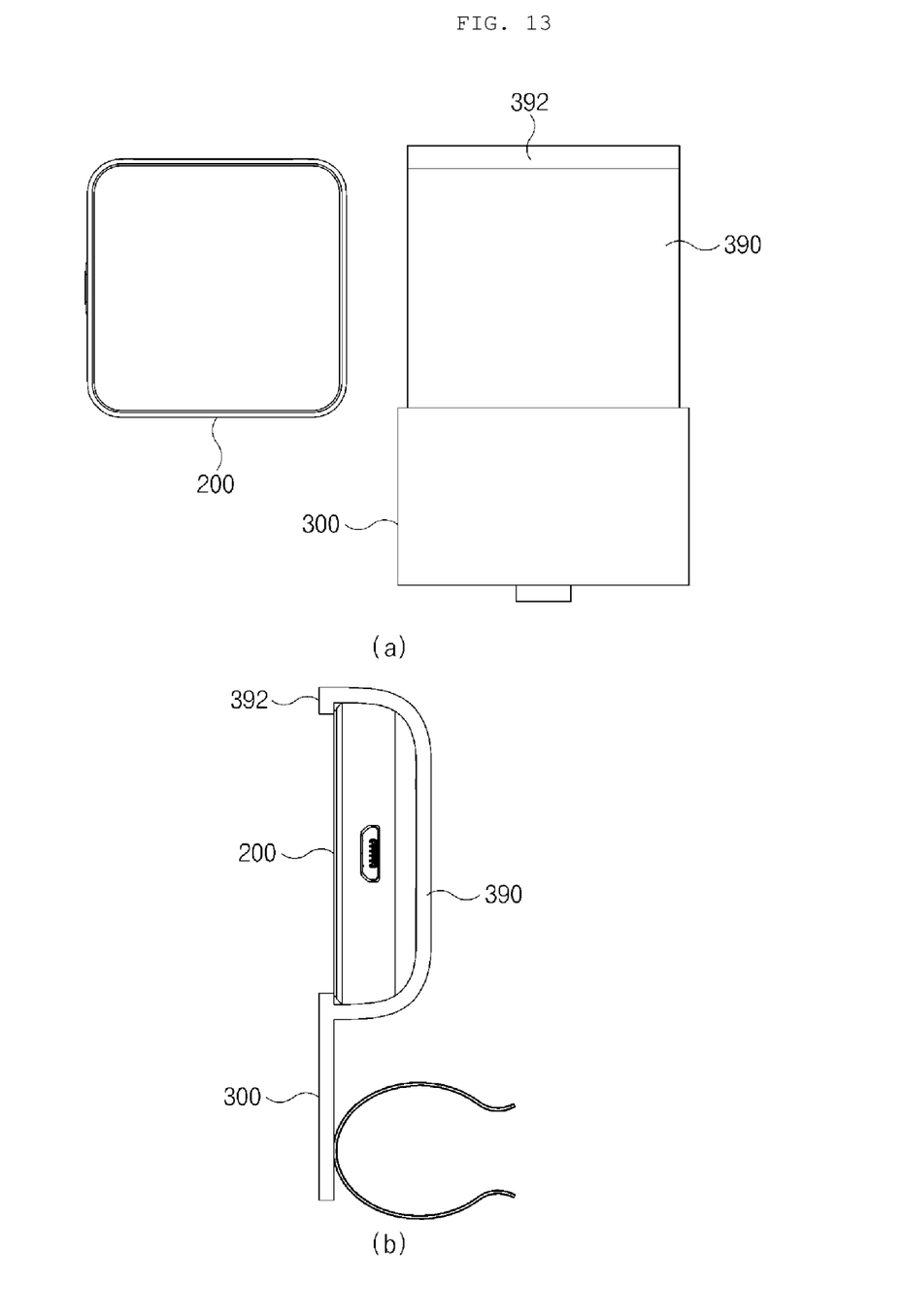

In FIG. 13, (a) shows a state before the root canal length measuring device is mounted on the dental ruler, and in FIG. 13, (b) shows a state in which the root canal length measuring device is mounted on the dental ruler.

As shown in (a) and (b) of FIG. 13, the dental ruler 300 and the root canal length measuring device 200 can be joined by a separate mounting cover.

To this end, the dental ruler 300 has a mounting cover 390 for locking the rear surface of the case of the root canal length measuring device 200. The mounting cover 390 is provided in such a size that its lower end portion can be joined with an upper portion of the dental ruler 300 and it can lock the root canal length measuring device 200. Further, the edge portion of the mounting cover 390 has a hook 392 for improving joint strength in a case where the root canal length measuring device 200 is inserted.

As described above, the root canal length measuring device of the present invention has advantages in which the root canal length measuring device can be mounted on dental rulers in various manners, and it is convenient and easy to use the root canal length measuring device.

The above-described embodiment has been described as an example with reference to the drawings for a more thorough understanding of the present invention, and should not be construed to limit the present invention. Also, it is apparent that those skilled in the art can make various modifications and variations without departing from the basic principle of the present invention.

The invention claimed is:
1. A root canal length measuring device comprising:
a measuring module configured to include a file hook which is electrically connected to an endodontic file for removing dental pulps from root canals and enlarging root canals, a lip hook which is configured to be connected to a lip or a gum serving as a ground, and a cable and a connector to which the file hook and the lip hook are connected;
a control module configured to measure the value of impedance which varies as the endodontic file moves from the surface of a tooth toward the apex of the root of the tooth, and provide a signal representing information on the position of the apex of the root of the tooth and information on the length of the apex of the root of the tooth;
a near field communication module configured to receive the signal representing the information on the position of the apex of the root of the tooth and the information on the length of the apex of the root of the tooth calculated by the control module, from the control module, and wirelessly transmit the received signal to a smart device in real time;
a case accommodating the control module and the near field communication module and having a display on a front surface and a connecting hole for establishing a connection with the measuring module;
a mounting unit of which one end portion is hinged on a rear surface of the case and the other end portion has a straight protrusion protruding toward the rear surface of the case and is movable with respect to the rear surface of the case;
an elastic connecting member installed between the one end portion of the mounting unit and the case for urging the straight protrusion of the mounting unit toward the case by an elastic force when the straight protrusion of the mounting unit is moved away from the case; and
a dental ruler which has a straight hole and is configured to be worn on a finger of a user like a ring in order to measure the length of the endodontic file,
wherein the mounting unit is mounted on a portion of the dental ruler, and
wherein the dental ruler is disposed between the case and the other end portion of the mounting unit, and the straight protrusion of the mounting unit is inserted into the straight hole of the dental ruler to contact the rear surface of the case in a state that the mounting unit is mounted on the dental ruler.

2. The root canal length measuring device according to claim 1, wherein:
the smart device is any one of a smart phone, a tablet PC, and a laptop.

3. The root canal length measuring device according to claim 2, wherein:
the near field communication module is any one module selected from Bluetooth modules for Bluetooth communication, Zigbee communication modules, and WiFi communication modules.

4. The root canal length measuring device according to claim 1, wherein:
the near field communication module is any one module selected from Bluetooth modules for Bluetooth communication, Zigbee communication modules, and WiFi communication modules.

5. The root canal length measuring device according to claim 1, further comprising:
at least one joint groove formed in a side surface of a case so as to be capable of being mounted on a portion of a dental ruler to be worn on a finger of a user like a ring in order to measure the length of the endodontic file,
wherein one side surface of the dental ruler has at least one joint protrusion to be inserted into the at least one joint groove.

6. The root canal length measuring device according to claim 1, wherein:
the root canal length measuring device and a dental ruler to be worn on a finger of a user like a ring in order to measure the length of the endodontic file have a ball joint combination structure, and
the dental ruler has a ball, and a case of the root canal length measuring device has a casing for receiving the ball.

7. The root canal length measuring device according to claim 1, wherein:
the root canal length measuring device and a dental ruler to be worn on a finger of a user like a ring in order to measure the length of the endodontic file have a joint structure using permanent magnets, and
a portion of the dental ruler has at least one first permanent magnet, and one side of the rear surface of a case of the root canal length measuring device has at least one second permanent magnet to be joined with the first permanent magnet.

8. The root canal length measuring device according to claim 1, wherein:
the root canal length measuring device is mounted on a dental ruler to be worn on a finger of a user like a ring in order to measure the length of the endodontic file,
a portion of the dental ruler has a shape hole having a predetermined shape,
the rear surface of a case of the root canal length measuring device has a shaft protruding by a predetermined length, and a shape plate formed at the end portion of the shaft such that it becomes the same shape as that of the shape hole if rotating 180 degrees, and
after the shape plate is inserted into the shape hole, if the root canal length measuring device is rotated 180 degrees, the dental ruler and the root canal length measuring device are joined.

9. The root canal length measuring device according to claim 1, wherein:
the root canal length measuring device is joined with a dental ruler to be worn on a finger of a user like a ring in order to measure the length of the endodontic file, in a sliding manner,
a portion of the dental ruler has a sliding rail groove having a predetermined length,
the rear surface of a case of the root canal length measuring device has a sliding rail protrusion having a predetermined length, and
the rail protrusion is inserted into the rail groove in a sliding manner, whereby the root canal length measuring device is joined with the dental ruler.

10. The root canal length measuring device according to claim 1, wherein:
the root canal length measuring device can be mounted on a dental ruler to be worn on a finger of a user like a ring in order to measure the length of the endodontic file, and
the dental ruler has a mounting cover for locking the rear surface of a case of the root canal length measuring device, and the edge portion of the mounting cover has a hook for improving joint strength in a case where the root canal length measuring device is inserted.

* * * * *